June 27, 1967 W. S. SWAN 3,327,615
COFFEE DISPENSER WITH BUILT-IN GRINDER
Filed Jan. 4, 1965 4 Sheets-Sheet 2
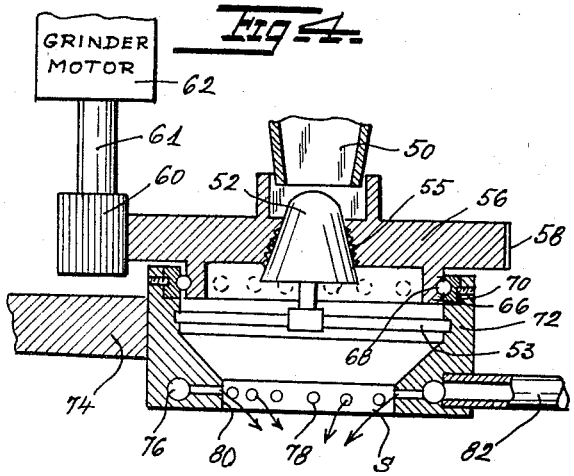
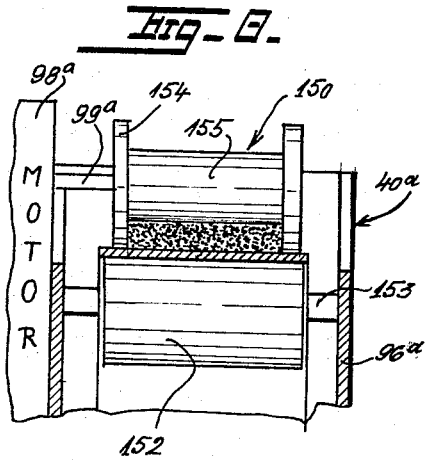
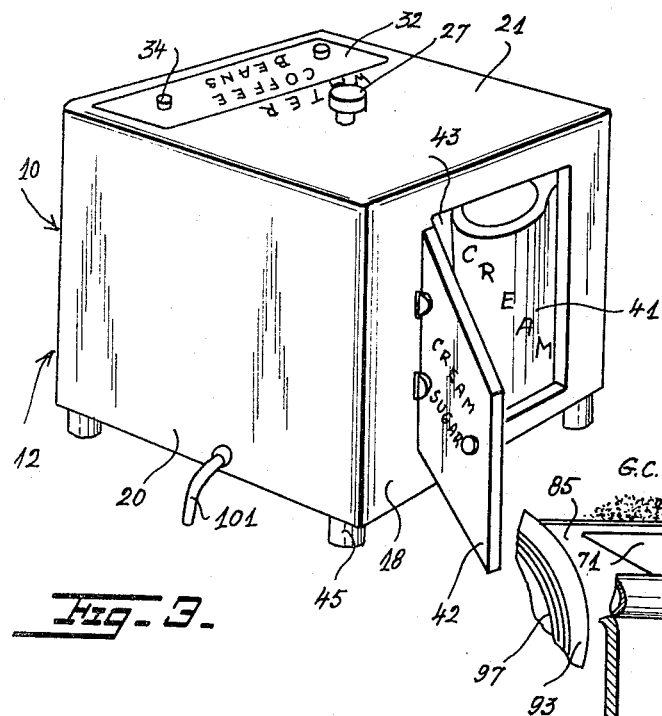
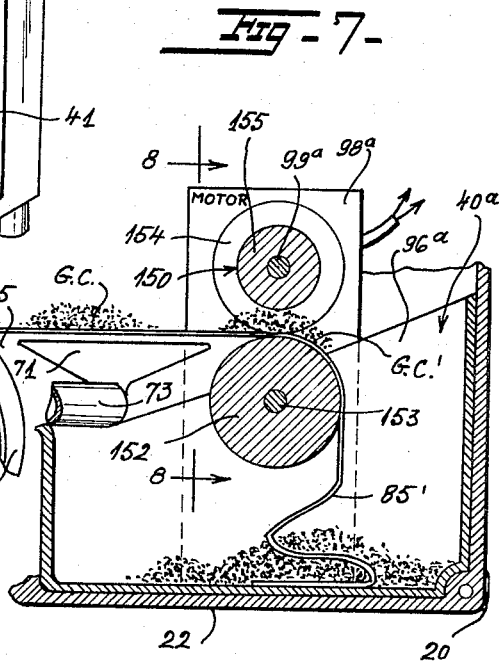
INVENTOR.
William S. Swan
BY
Polachek & Saulsbury
ATTORNEYS.

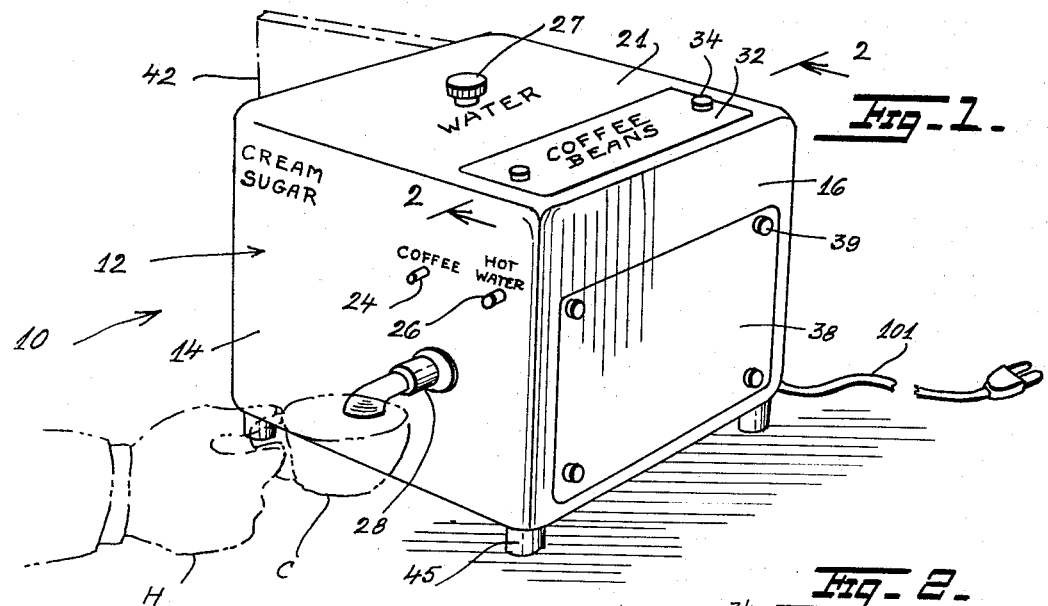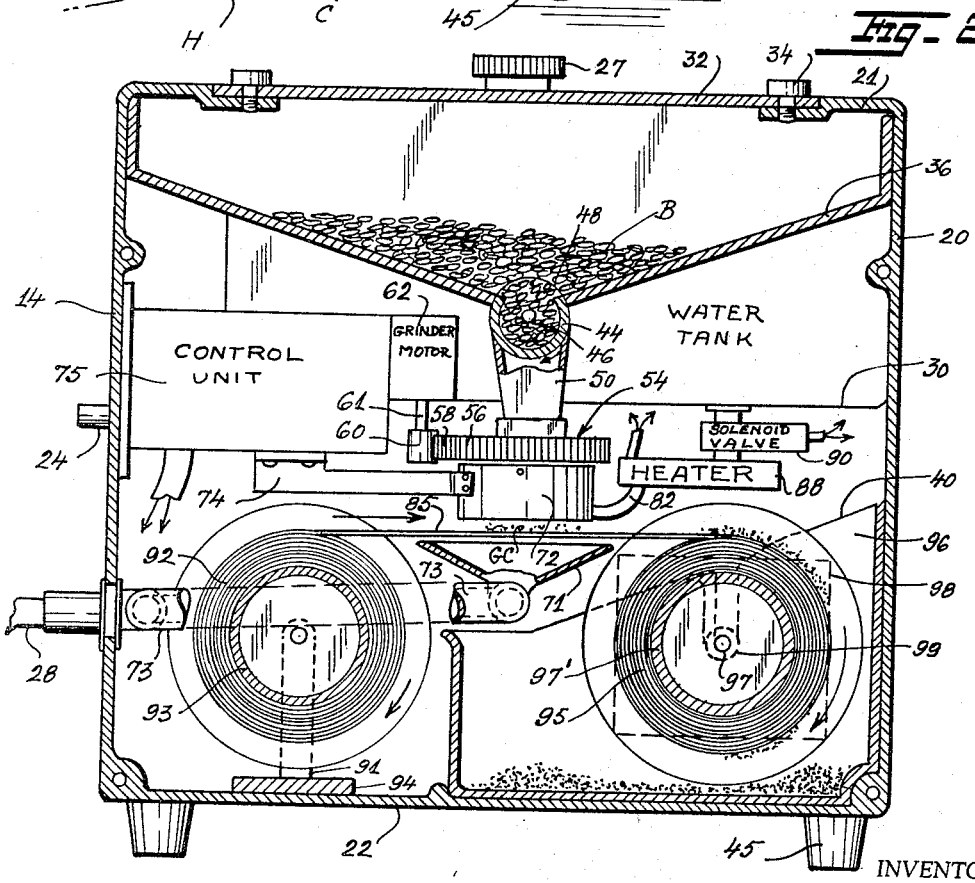

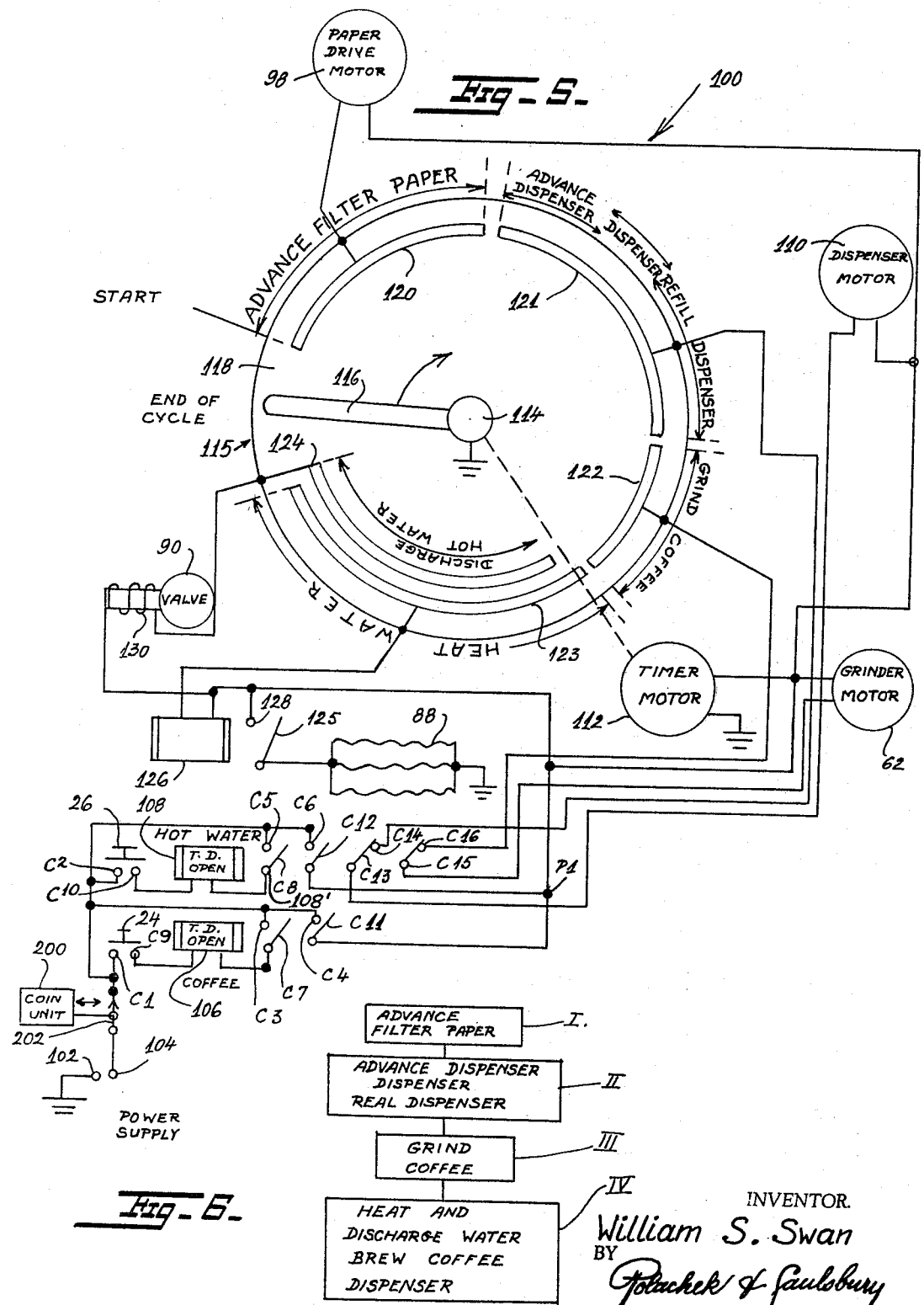

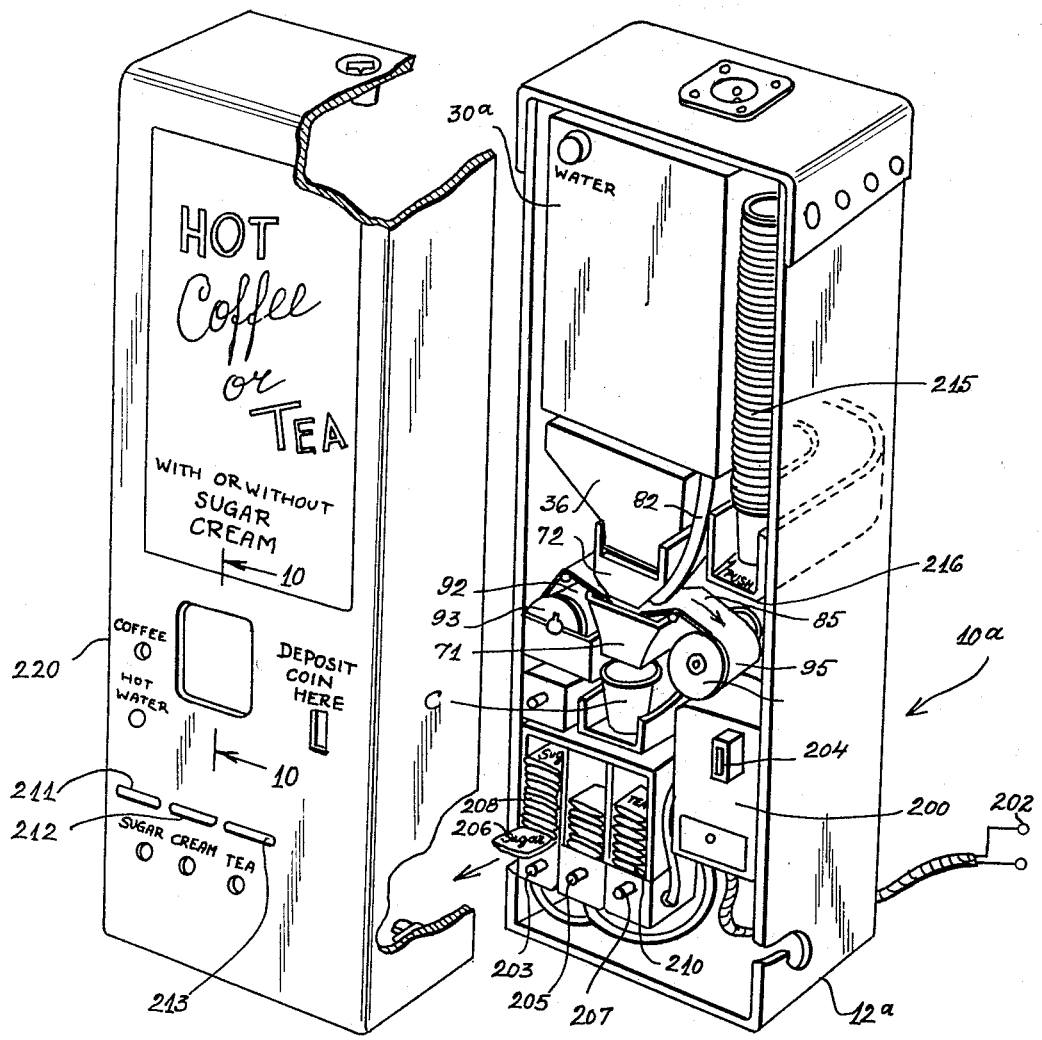
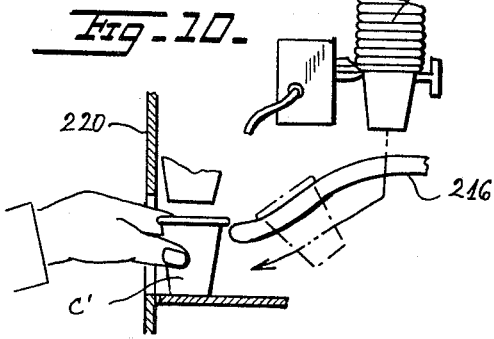

United States Patent Office 3,327,615
Patented June 27, 1967

3,327,615
COFFEE DISPENSER WITH BUILT-IN GRINDER
William S. Swan, 319 W. 100th St.,
New York, N.Y. 10025
Filed Jan. 4, 1965, Ser. No. 423,246
2 Claims. (Cl. 99—286)

This invention concerns a coffee grinding, brewing and dispensing device.

According to the invention there is provided a coffee grinding, brewing and dispensing device having a hopper in which coffee beans are contained. A measuring cylinder is rotatably disposed below the hopper for receiving a predetermined quantity of beans sufficient to brew one cup of coffee. The measuring cylinder feeds the beans into a coffee bean grinder which in turn deposits the ground coffee upon a sheet of filter paper. The paper is fed from a supply roll to a takeup roll. A valve controlled hot water heater releases hot water upon the ground coffee on the filter paper, and brewed coffee drains into a conduit through which it is discharged into a waiting cup. The device includes an automatically timed and cycled control system which is electrically operated in response to manual pressure upon a control switch for automatically depositing the measured quantity of coffee beans in the grinder, grinding the beans, heating and discharging hot water, and advancing the filter paper. The device can be embodied in a relatively small cabinet which can stand on a table top or desk. In the cabinet may be provided a refrigeration compartment for storing milk or cream, sugar, etc. The device may be provided with a selector switch for operating the device to discharge hot water alone. The device can be made up in larger size and capacity in association with a coin controlled mechanism for installation in public places such as factories, office buildings, railroad stations, airline and bus terminals and wherever there is sufficient traffic and demand for a larger unit.

It is therefore one object of the invention to provide a device for automatically measuring, grinding, brewing and dispensing hot coffee.

A further object is to provide a device of this type arranged to dispense hot water alone on demand.

Another object is to provide a device of the type described contained in a small cabinet which can stand on a table top or desk.

A further object is to provide a device of the type described embodied in a coin controlled hot coffee or hot water dispensing machine.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 1 is a perspective view of the front, top and one side of a device embodying the invention.

FIG. 2 is an enlarged sectional view taken on line 2—2 of FIG. 1.

FIG. 3 is a perspective view of the rear, top and other side of the device, a door being shown open.

FIG. 4 is an enlarged sectional view of the coffee bean grinding mechanism of the device.

FIG. 5 is a diagram of the automatic electric control system of the device.

FIG. 6 is a flow chart of an operating cycle of the device.

FIG. 7 is a fragmentary sectional view similar to a part of FIG. 2 showing another takeup means for spent coffee grounds and filter paper.

FIG. 8 is a fragmentary sectional view taken on line 8—8 of FIG. 7.

FIG. 9 is an exploded perspective view of parts of a coin controlled unit embodying the invention, parts being shown broken away.

FIG. 10 is a fragmentary sectional view taken on line 10—10 of FIG. 9, with parts assembled.

Referring first to FIGS. 1-4, there is shown the coffee grinding, brewing and dispensing device 10 including a generally rectangular cabinet 12 which may be approximately a cube having a volume of about one cubic foot or less. The cabinet has a front wall 14, side walls 16, 18, rear wall 20, top wall 21, and bottom wall 22. On the front wall are two pushbutton switches 24, 26 which are used selectively for drawing freshly brewed hot black coffee or hot water. A nozzle 28 at the front wall discharges liquid coffee or hot water into a cup C indicated in dotted lines held in the hand H of a person using the device.

On the top wall 21 is a screw cap 27 closing an opening in a water tank 30 in the cabinet. A panel 32 removably held by bolts 34 closes an opening into a hopper 36 which can be filled with coffee beans B.

In side wall 16 is a closure plate 38 removably held by bolts 39 providing access to a waste can or container 40 into which spent coffee grounds and filter paper are passed.

In side wall 18 is a door 42 providing access into a compartment 43 which may be refrigerated. The compartment may contain a container 41 of milk and/or cream. Sugar, lemons, tea balls and other beverage ingredients may be stored in compartment 43. The cabinet stands on short legs 45.

Inside the cabinet 12 at the mouth of the hopper 36 is a cylinder 44 rotatably mounted on a shaft 46. The shaft is driven by a motor. The cylinder has a lateral opening 48 and normally assumes an upward open position as shown in FIG. 2 so that the cylinder can be filled gravitationally with coffee beans. A nozzle 50 is located below the axially horizontal cylinder. Coffee beans discharge into this nozzle and are deposited upon conical distributor head 52 in coffee bean grinder 54; see FIG. 4. The head 52 is supported on spider arms 53.

The coffee bean grinder includes a grinder plate or disk 56 with a central opening 55 having teeth formed thereon. The coffee beans are ground between the teeth of the grinder plate and side of conical head 52 as the plate 56 rotates. The plate has gear teeth 58 on its outer periphery engaged by a drive gear 60 on a shaft 61 of a motor 62. The plate 56 has a depending cylindrical race 66 engaged via ball bearings 68 with bearing race 70 secured to cylindrical housing 72 of the grinder. The housing is supported by a bracket 74 at the underside of control unit 75 in which are housed automatic control components of the device.

At the base of housing 72 is a circumferential bore 76 having lateral openings 78 at the central opening 80 in the bottom of the housing. Connected to bore 76 at one side of the housing is a conduit 82 for feeding hot water into the bore 76 from which the water is discharged in a fine spray S upon a heap of ground coffee GC lying upon a portion of filter paper 85. Conduit 82 is connected to water tank 30 via an electrically controlled and operated water heater 88 and a solenoid controlled valve 90.

Filter paper 85 is carried on an axially horizontal supply roll 92 having a spool 93 mounted rotatably in upstanding arms 91 of bracket 94. The filter paper has a horizontal course passing under the grinder housing 72 and terminating on a takeup roll 95 having a spool 97 carried by side walls 96 of container 40. The roll is driven by a motor 98 having a shaft 99 engaged with the projecting end 97' of spool 97. A power supply cable 101 is connected to control unit 75.

Under the grinder housing 72 and the horizontal course of filter paper is a funnel 71 opening into conduit 73 which terminates in nozzle 28.

FIG. 5 shows schematically the control system 100 employed in the device 10. The system has two electric power supply terminals 102, 104. Terminal 102 is grounded. Terminal 104 is connected to contact C1 of pushbutton switch 24, contact C2 of pushbutton switch 26, contacts C3, C4 of time delay relay 106 and contacts C5, C6 of time delay relay 108. Switch contact C7 is connected to one terminal of relay 106. Switch contact C8 is connected to one terminal of relay 108. The other terminals of the relays are connected respectively to relay contacts C9 and C10. Relay contacts C11 and C12 are connected to circuit point P1. Relay 108 has two pairs of normally closed contacts C13, C14 and C15, C16. The contacts C13 and C14 are connected in series with motor 110 which drives the coffee bean measuring cylinder 44. Contacts C15, C16 are connected in series with coffee bean grinder motor 62.

The system includes a timer having a timer motor 112. One terminal of the motor is grounded. The other terminal is connected to circuit point P1. The motors 62 and 110 and paper drive motor 98 also have terminals connected to circuit point P1. Timer motor 112 drives grounded shaft 114 of a timer switch 115. The switch has a conductive arm 116 carried on shaft 114. On the insulated base 118 of the switch 115 is a series of arcuate contacts 120, 121, 122 and 123. A further arcuate contact 124 is located radially inward of contact 123. The electrical resistance elements of hot water heater 88 are connected at one end to contact 125 of a relay 126. The other end of the heater 88 is grounded. Relay 126 has contact 128 and one terminal of the relay coil connected to circuit point P1. The other terminal of the relay coil is connected to switch contact 123. The solenoid controlled valve 90 has one terminal of solenoid 130 connected to contact 124. The other terminal of the solenoid is connected to circuit point P1. Contact 120 is connected to one terminal of paper drive motor 98. Contact 121 is connected to contact C14. Contact 122 is connected to contact C16.

In operation of the device 10, the user places a cup C under nozzle 28 and pushes the button of switch 24 or 26 depending on whether he wishes hot coffee or clear hot water. Suppose the user presses the button of switch 24 marked COFFEE on front wall 14 of the device. This will immediately energize relay 106 which will remain energized during the operating cycle for a predetermined time considerably less than one minute. Fifteen to twenty seconds will generally be sufficient to perform the operating cycle. Relay contacts C3, C7 and C4, C11 close. Relay contacts C3, C7 constitute a holding circuit keeping the relay energized even though switch 24 is open as the user releases switch 24. Relay contacts C4, C11 when connector power supply terminal 104 to circuit point P1. The timer motor 112 becomes energized and arm 116 is rotated clockwise as viewed in FIG. 5 from the starting position to contact 120. This closes the circuit of paper drive motor 98 which rotates slowly only enough to present a fresh section of paper 85 under the grinder. As the arm 116 leaves contact 120, motor 98 stops and motor 121 starts. This rotates cylinder 44 360°. As the opening 48 passes nozzle 50 the coffee beans in the cylinder are dispensed or discharged into the nozzle 50. The cylinder stops in the position shown in FIG. 2, with opening 48 uppermost. The arm 116 passes to contact 122 and the grinder motor is started to grind the beans fed through nozzle 50. The grinder motor stops as arm 116 leaves contact 122 and reaches contacts 123, 124. The ground coffee GC is deposited upon the fresh section of filter paper 85. Heater 88 becomes energized and starts heating of water which is released from tank 30 by valve 90 which also becomes energized as contacts 123, 124 are grounded through arm 116. The hot water is sprayed out of holes 78 upon the heap of ground coffee and the brewed coffee drips into funnel 71 from which it passes gravitationally through conduit 73 and nozzle 28 to cup C. Heating of water and closure of valve 90 occur as arm 116 leaves contact 116. The time delay relay 106 then opens and stops the timer motor 112 leaving the arm 116 at the starting position of FIG. 2.

Suppose the user desires only a cup full of hot water for making a cup of tea or other purpose. He presses the button of hot water selector switch 26 marked HOT WATER on the front wall 14 of the device. Now time delay relay 108 is energized at once. This relay will remain energized during the hot water heating cycle and will then open automatically. Contacts C5, C8 close and provide a holding circuit for relay 108. Contacts C6, C12 close and connect power supply terminal 104 to point P1. Contacts C13, C14 open to keep the grinder motor 62 deactivated during this cycle. Contacts C15, C16 close and keep bean dispenser motor 110 deactivated during this cycle. The filter paper is advanced as arm 116 reaches contact 120 to clear the spent ground coffee and section of filter paper away from the grinder. Motors 62 and 110 remain inactive when arm 116 is at contacts 121, 122. At contacts 123, 124 the heater 88 and valve solenoid 130 are energized and hot water flows into cup C. At the end of the hot water discharge cycle, relay 108 opens and the heater and solenoid are both deenergized.

FIG. 6 is a flow chart summarizing the principal operating cycle of the system to obtain brewed coffee. First the filter paper is advanced in step I. In step II the bean dispensing cylinder 48 is rotated. In step III the coffee beans are ground. In step IV the hot water is heated and discharged. The coffee is simultaneously brewed and discharged. To effect the discharge of hot water alone, steps II and III will be omitted and step IV will be modified by omission of the coffee brewing step.

FIG. 7 and FIG. 8 show another arrangement for handling the spent coffee grounds and filter paper. Instead of rolling up the coffee grounds and paper as is performed with the device 10 of FIG. 2, the filter paper 85' is passed between a drive roller 150 and an idler roller 152. Roller 152 has shaft 153 and is journaled in opposite sides 96a of container 40a. Drive roller 150 is connected to shaft 99a of motor 98a. This roller has end disks 154 engaging opposite margins of the paper on roller 152. Thus the spent coffee grounds GC' clear the central body 155 of the roller 150 and falls along with the spent paper 85' into the waste container 40a.

FIGS. 9 and 10 show another coffee and hot dispensing device 10a which is basically similar to device 10 and corresponding parts are identically numbered. This device is housed in a large cabinet 12a to store a large quantity of water in tank 30a and a larger quantity of coffee beans in the hopper. The device has a coin controlled mechanism 200 of conventional type which serves to close switch 202 in circuit 100 when a proper coin is deposited in slot 204 and then to open the switch after the beverage is dispensed. When pushbutton 203, 205 or 207 is pressed a package 206 of sugar, a package 208 of cream, or a package 210 of tea is dispensed through slots 211, 212 or 213. A cup C' is dispensed from a stack 215 of cups down a chute 216 in a conventional arrangement. The device 10a can be installed in public places where persons can select the kind of beverage at will upon depositing a proper coin. The device 10a insofar as the coffee measuring, grinding and brewing are concerned, operates in the same manner as already described in connection with device 10. Hot water is heated and dispensed in the same manner as in device 10. In FIG. 9 the front 220 of the cabinet is shown removed and parts broken away to expose internal parts of the device. FIG. 10 shows parts of the cup feeding arrangement including chute 216 and stack 215.

There has thus been provided according to the invention, devices which will deliver freshly ground and brewed coffee in a few seconds upon demand. The apparatus can be made up as small unit for home or office use or in large size for installation in public places where a large number of cups of beverage are required. The coffee beans are kept fresh in the hopper enclosed in the cabinet of the device, so that users are always assured of a fresh tasting cup of coffee.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A device for dispensing beverage, comprising a cabinet, a hopper for containing coffee beans mounted in said cabinet, a water tank in said cabinet, a coffee bean measuring cylinder rotatably disposed at the bottom of the hopper for receiving the predetermined quantity of beans therefrom, a perforated circular coffee bean grinder including a distributing head disposed under the cylinder for receiving coffee beans therefrom, a supply means of filter paper, a takeup means for spent filter paper and coffee grounds, said filter paper having a horizontal course disposed under said grinder for receiving ground coffee therefrom, said horizontal course extending between the supply and takeup means, a water spraying device under the grinder, a conduit connecting the water tank and spray head for spraying water upon the ground coffee on the filter paper, a solenoid operated valve in said conduit for controlling flow of water from the tank, an electrically operated heater at said conduit for heating the water passing therethrough, a funnel under the horizontal course of filter paper and grinder for receiving brewed coffee, and a discharge conduit for brewed coffee connected to said funnel and terminating outside the cabinet for dispensing the brewed coffee, and a control system including a timer motor driving a timer, a switch having a plurality of sequentially closable contacts, drive motors respectively connected in circuit with certain of said switch contacts and operatively arranged to drive the filter paper takeup means, the grinder, and the measuring cylinder, said switch having other contacts respectively connected in circuit with the solenoid of said valve and said heater respectively, whereby in sequence the filter paper is advanced under the grinder, the cylinder is rotated, the grinder is actuated, and water is discharged from the tank, heated and sprayed upon the ground coffee, said control system further including a time delay means for stopping operation of the timer motor after a predetermined quantity of water is heated and discharged from the tank, heated and sprayed on the filter paper, a coin operated mechanism for activating said control system after deposition of a suitable coin in the mechanism, a stack of cups in the cabinet, and means for automatically dispensing one cup fed from the stack and locating it under the discharge conduit.

2. A device for dispensing beverage, comprising a cabinet, a hopper for containing coffee beans mounted in said cabinet, a water tank in said cabinet, a coffee bean measuring cylinder rotatably disposed at the bottom of the hopper for receiving the predetermined quantity of beans therefrom, a perforated circular coffee bean grinder including a distributing head disposed under the cylinder for receiving coffee beans therefrom, a supply means of filter paper, a takeup means for spent filter paper and coffee grounds, said filter paper having a horizontal course disposed under said grinder for receiving ground coffee therefrom, said horizontal course extending between the supply and takeup means, a water spraying device under the grinder, a conduit connecting the water tank and spray head for spraying water upon the ground coffee on the filter paper, a solenoid operated valve in said conduit for controlling flow of water from the tank, an electrically operated heater at said conduit for heating the water passing therethrough, a funnel under the horizontal course of filter paper and grinder for receiving brewed coffee, and a discharge conduit for brewed coffee connected to said funnel and terminating outside the cabinet for dispensing the brewed coffee, and a control system including a timer motor driving a timer, a switch having a plurality of sequentially closable contacts, drive motors respectively connected in circuit with certain of said switch contacts and operatively arranged to drive the filter paper takeup means, the grinder, and the measuring cylinder, said switch having other contacts respectively connected in circuit with the solenoid of said valve and said heater respectively, whereby in sequence the filter paper is advanced under the grinder, the cylinder is rotated, the grinder is actuated, and water is discharged from the tank, heated and sprayed upon the ground coffee, said control system further including a time delay means for stopping operation of the timer motor after a predetermined quantity of water is heated and discharged from the tank, heated and sprayed on the filter paper, a coin operated mechanism for activating said control system after deposition of a suitable coin in the mechanism, a stack of cups in the cabinet, and means for automatically dispensing one cup fed from the stack and locating it under the discharge conduit, and selector means for selectively discharging a package of sugar, cream, tea and the like from the cabinet.

References Cited

UNITED STATES PATENTS

| | | | |
|---|---|---|---|
| 1,736,460 | 11/1929 | Pistoni et al. | 99—286 |
| 2,680,802 | 6/1954 | Bremer et al. | 99—282 |
| 2,827,845 | 3/1958 | Richeson | 99—286 X |
| 2,846,938 | 8/1958 | Brandl | 99—281 |
| 2,879,811 | 3/1959 | Parraga | 99—289 |
| 2,939,380 | 6/1960 | Parraga | 99—302 X |
| 3,046,869 | 7/1962 | Reynolds | 99—289 |
| 3,095,800 | 7/1963 | Gilbert | 99—289 |
| 3,153,377 | 10/1964 | Bosak | 99—286 X |
| 3,208,369 | 9/1965 | Greenly et al. | 99—289 X |

WALTER A. SCHEEL, *Primary Examiner.*

S. P. FISHER, *Assistant Examiner,*